United States Patent
Wiesen (10) Patent No.: US 8,488,752 B1
(45) Date of Patent: Jul. 16, 2013

(54) SYSTEM AND METHOD FOR RECORDING VOICEMAIL

(75) Inventor: Alex Wiesen, Santa Clara, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/616,528

(22) Filed: Sep. 14, 2012

(51) Int. Cl.
*H04M 1/64* (2006.01)
*H04W 4/00* (2009.01)

(52) U.S. Cl.
USPC ............ 379/88.17; 379/88.13; 379/88.18; 379/211.02; 379/374.03; 455/413; 455/466

(58) Field of Classification Search
USPC ............ 379/88.13, 88.17, 88.18, 211.02, 379/374.03; 455/413, 466
See application file for complete search history.

(56) References Cited

U.S. PATENT DOCUMENTS

| | | | |
|---|---|---|---|
| 6,243,444 B1* | 6/2001 | O'Neal | 379/88.17 |
| 6,385,305 B1* | 5/2002 | Gerszberg et al. | 379/88.13 |
| 6,891,934 B1* | 5/2005 | Gao et al. | 379/88.17 |
| 6,947,528 B1* | 9/2005 | Ko et al. | 379/88.17 |
| 6,950,502 B1 | 9/2005 | Jenkins | |
| 7,251,314 B2 | 7/2007 | Huang | |
| 7,616,749 B2* | 11/2009 | Poustchi | 379/211.02 |
| 7,751,537 B2* | 7/2010 | Poustchi et al. | 379/88.18 |
| 7,751,546 B2* | 7/2010 | Poustchi et al. | 379/211.02 |
| 7,885,392 B2 | 2/2011 | Fujita-Yuhas | |
| 8,180,382 B1* | 5/2012 | Graefen | 455/466 |
| 8,340,646 B2* | 12/2012 | Wang et al. | 455/413 |
| 2005/0238148 A1* | 10/2005 | Poustchi et al. | 379/88.17 |
| 2005/0287993 A1* | 12/2005 | Gogic | 455/413 |
| 2008/0089509 A1* | 4/2008 | Wuthnow et al. | 379/374.03 |

* cited by examiner

*Primary Examiner* — Gerald Gauthier
(74) *Attorney, Agent, or Firm* — Leydig, Voit & Mayer, Ltd.

(57) ABSTRACT

A system and method for recording voicemail. The system includes a first phone, a second phone, and a server. A call is placed from the first phone to the second phone. The server is configured to transmit a notification to the first phone to initiate recording of a voicemail at a location local to the first phone, receive a file of the voicemail recorded by the first phone, store the recorded voicemail, and establish a session between the server and the second phone to access the recorded voicemail.

20 Claims, 7 Drawing Sheets

SYSTEM AND METHOD FOR RECORDING VOICEMAIL

BACKGROUND

One of the primary objectives when establishing a telephone call connection with another person is to communicate information to the other person. However, the other person may not be available when an incoming call is received and, therefore, does not answer the call. In such situations, the caller can leave a voicemail for the other person to retrieve at a later time.

Figure 1:
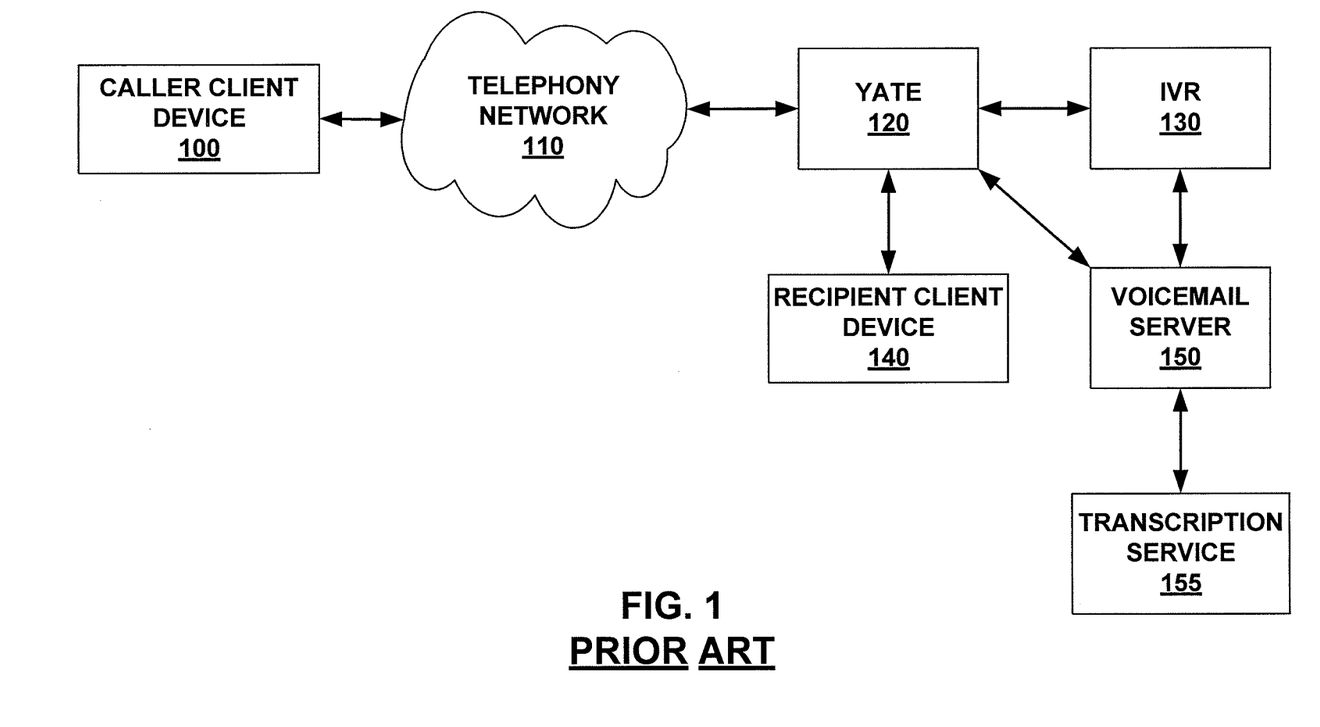
FIG. 1 is a block diagram of an example voicemail recording environment, according to the prior art.

FIG. 1 is a block diagram of an example voicemail recording environment, according to the prior art. A caller client device 100, such as a mobile phone, places a call over a telephony network 110 to recipient client device 140. The telephony network 110 may be a VoIP (Voice over Internet Protocol) or PSTN (Public Switched Telephone Network). The call is routed and/or intercepted by a YATE (Yet Another Telephony Engine) 120, which facilitates and manages various call functions. For example, the YATE 120 can pass the call to an IVR (Interactive Voice Response) system 130 that is configured to prompt the caller for various information. For example, the IVR system 130 may prompt the caller to record a voicemail. The IVR system 130 notifies the YATE 120 and the YATE 120 records the voicemail over the telephony network 110. The YATE 120 stores the voicemail in a voicemail server 150. The IVR 130 does not communicate directly with the recipient client device 140-YATE 120 is responsible for handling and directing all audio to the recipient client device 140. For example, the IVR 130 indicates to the YATE 120 which audio to play in certain scenarios, such as when recording voicemail. Optionally, a transcription service 155 can transcribe the recorded voicemail file and provide a text-based transcription of the voicemail to the recipient client device 155.

One problem with the conventional system for recording voicemail is that the audio quality of the voicemail is poor. As described, the voicemail is recorded over the telephony network 110, which introduces noise and artifacts into the recorded audio. The noise and artifacts can severely degrade the audio quality of the voicemail, making the voicemail difficult to understand for the recipient.

Accordingly, there remains a need for a system and method for recording voicemail that overcomes the audio quality problems described above.

SUMMARY

One embodiment provides a method for recording voicemail. The method includes receiving a call placed over a telephony network from a first phone number to a second phone number, wherein the first phone number is associated with a first client device capable of recording voicemail files at the first client device; transmitting a notification to the first client device associated with the first phone number to initiate recording of a voicemail at a location local to the first client device, wherein the notification is transmitted over a data network; receiving over the data network the recorded voicemail; terminating the call placed over the telephony network; storing the recorded voicemail; and establishing a session with a second client device associated with the second phone number so as to allow the second client device to access the recorded voicemail.

Another embodiment includes a method for recording voicemail. The method includes placing a call from a first phone number to a second phone number; receiving a notification to initiate local recording of a voicemail; recording a voicemail file; compressing the recorded voicemail file; and transmitting the recorded and compressed voicemail file to be stored in a server.

Yet another embodiment includes a system for recording voicemail. The system includes: a first phone; a second phone, wherein a call is placed from the first phone to the second phone; and a server configured to: transmit a notification to the first phone to initiate recording of a voicemail at a location local to the first phone, receive a file of the voicemail recorded by the first phone, store the recorded voicemail, and establish a session between the server and the second phone to access the recorded voicemail.

DETAILED DESCRIPTION OF EXAMPLES

Embodiments disclosed herein provide a system and method for recording voicemails at a device of a caller and uploading the recorded voicemail to a server via a data link of the device. A first user using a device places a call to a second user. When the second user fails to answer the call, the call is passed to a voicemail processing engine, which can be implemented via an IVR (interactive voice response) system. The IVR system is configured to interact with a server, for example an API (Application Programming Interface) server, that sends a notification to the first user's device. The notification prompts the first user as to whether the first user would prefer to record the voicemail over the telephony network (i.e., the standard technique for recording voicemails) or locally on the first user's device. If the first user chooses to record the voicemail locally, then the call is effectively and/or actually terminated between the first phone and the IVR. A software application on the first user's phone is then configured to record the audio of the voicemail. The software application can be implemented in the OS (operating system) of the device, in a separate application installed on the device, and/or as part of the telephony software package of the device.

The locally recorded voicemail is uploaded as an audio file to a voicemail server via a data network (i.e., not via the telephony network) and/or the API server. The voicemail file can be stored in an electronic voicemail system that can provide "visual voicemail" and/or to a standard telephony voicemail server that is accessible by the recipient user over the telephony network. In some embodiments, the voicemail file is compressed before being uploaded to the voicemail server.

In this manner, the voicemail is recorded without passing through the telephony network. Advantageously, the audio quality of recorded voicemails is significantly improved.

Figure 2:
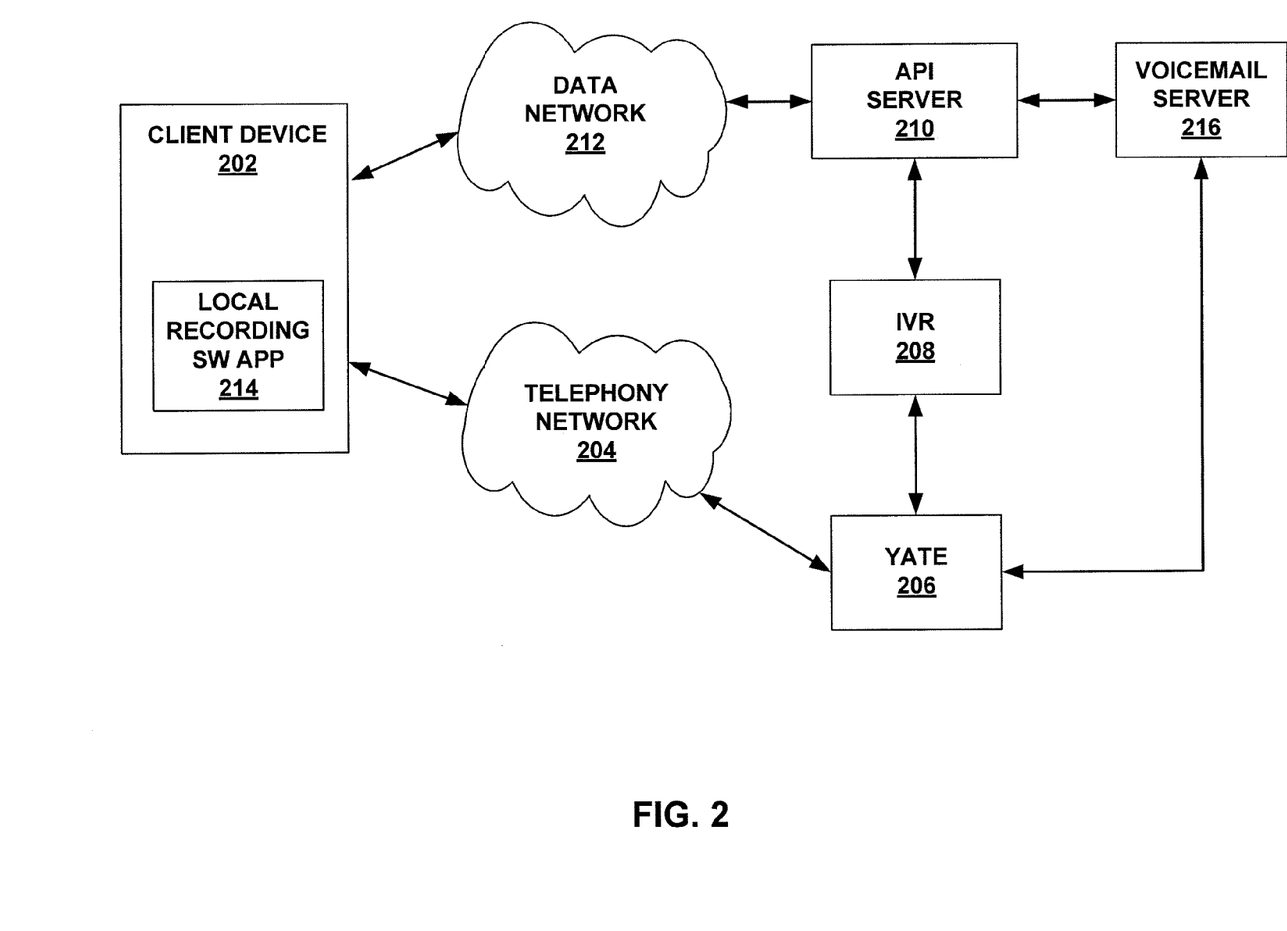
FIG. 2 is a block diagram of an example voicemail recording environment, according to one embodiment.

FIG. 2 is a block diagram of an example voicemail recording environment, according to one embodiment. In the embodiment illustrated by FIG. 2, a user operates a client device 202 configured to place a call over a telephony network 204. The client device 202 can be any type of computing device, including a personal computer, laptop computer, mobile phone with computing capabilities, or any other type of device capable of making a voice call. The telephony network 204 may be a VoIP (Voice over Internet Protocol), PSTN (Public Switched Telephone Network), a cellular phone network, or any other type of network for making voice calls.

The client device 202 includes application(s), a communications client, output devices (e.g., a display), and input devices (e.g., keyboard, mouse, touch screen). In some embodiments, a client device 202 may act as both an output device and an input device.

The call is routed through the telephony network to a YATE (Yet Another Telephony Engine) 206, which facilitates and manages various call functions. For example, the YATE 206 can pass the call to an IVR (Interactive Voice Response) system 208 that is configured to prompt the caller for various information. For example, the IVR system 208 can prompt the caller to record a voicemail.

The IVR system 208 is in data communication with a server, for example, an API (Application Programming Interface) server 210. The IVR system 208 and/or the API server 210 are configured to determine whether the client device 202 is capable of local recording of voicemail. If the IVR system 208 and/or the API server 210 determine that the client device 202 is not capable of local recording of voicemail, then voicemail is recorded over the telephony network 204, as in conventional voicemail recording systems.

If the IVR system 208 and/or the API server 210 determine that the client device 202 is capable of local recording of voicemail, then the API server 210 sends a notification to the client device 202 via a data network 212. In one embodiment, the data network 212 is separate and distinct from the telephony network 204. In some embodiments, such as in VoIP calls, the telephony network 204 and the data network 212 are the same network. The data network 212 can be any type of communications network, including an Internet network (e.g., wide area network (WAN) or local area network (LAN)), wired or wireless network, or mobile phone data network, among others.

The notification sent from the API server 210 is received by a local recording software application 214 executing on the client device 202. According to various embodiments, the local recording software application 214 can be implemented in the OS (operating system) of the client device 202, as a stand-alone application installed on the client device 202, and/or within phone audio software of the client device 202.

When the local recording software application 214 receives the notification, the local recording software application 214 prompts the user of the client device 202 as to whether the user would prefer to record a voicemail locally. The prompt may be audible via speakers of the client device 202 and/or visual via a display of the client device 202. If the user declines the prompt, then the voicemail is recorded in the conventional manner over the telephony network 204.

If the user accepts the prompt to record the voicemail locally, then the local recording software application 214 initiates local recording of the voicemail. The local recording is performed by the client device 202 via a microphone included in or attached to the client device 202. The recorded audio is stored as an audio file in a storage unit included in the client device 202. In some embodiments, the audio file is compressed on the client device 202.

The recorded, and optionally compressed, voicemail file is then uploaded over the data network 212 to the API server 210. The API server 210 forwards the recorded voicemail file to a voicemail server 216 for storage. According to one embodiment, the voicemail server 216 comprises an electronic voicemail server that provides recorded voicemail files to the recipient device as electronic files playable on the recipient device. In another embodiment, the voicemail server 216 comprises a telephony voicemail server to which the recipient can "call-in" to hear the voicemail.

In some embodiments, the API server 210 and the voicemail server 216 comprise the same server. According to various embodiments, the API server 210 and/or the voicemail server 216 can be physically separate machines or can be different processes running within the same physical machine. In some embodiments, the user may set various privacy controls related to the storage of the recorded voicemails on the voicemail server 216. Examples include anonymization of device identifiers and/or ability for a user to modify or delete information related to the user's use of the voicemail recording service.

Also, as shown in FIG. 2, the IVR system 208 does not directly communicate with the voicemail server 216. Instead, the interaction is mediated by the API server 210. Such a configuration is different from conventional techniques where an IVR system is in direct communication with a voicemail server, as shown in FIG. 1.

A transcription service (not shown) can transcribe the recorded voicemail file stored in the voicemail server 216 and provide a text-based transcription of the voicemail to the recipient device.

Figure 3:
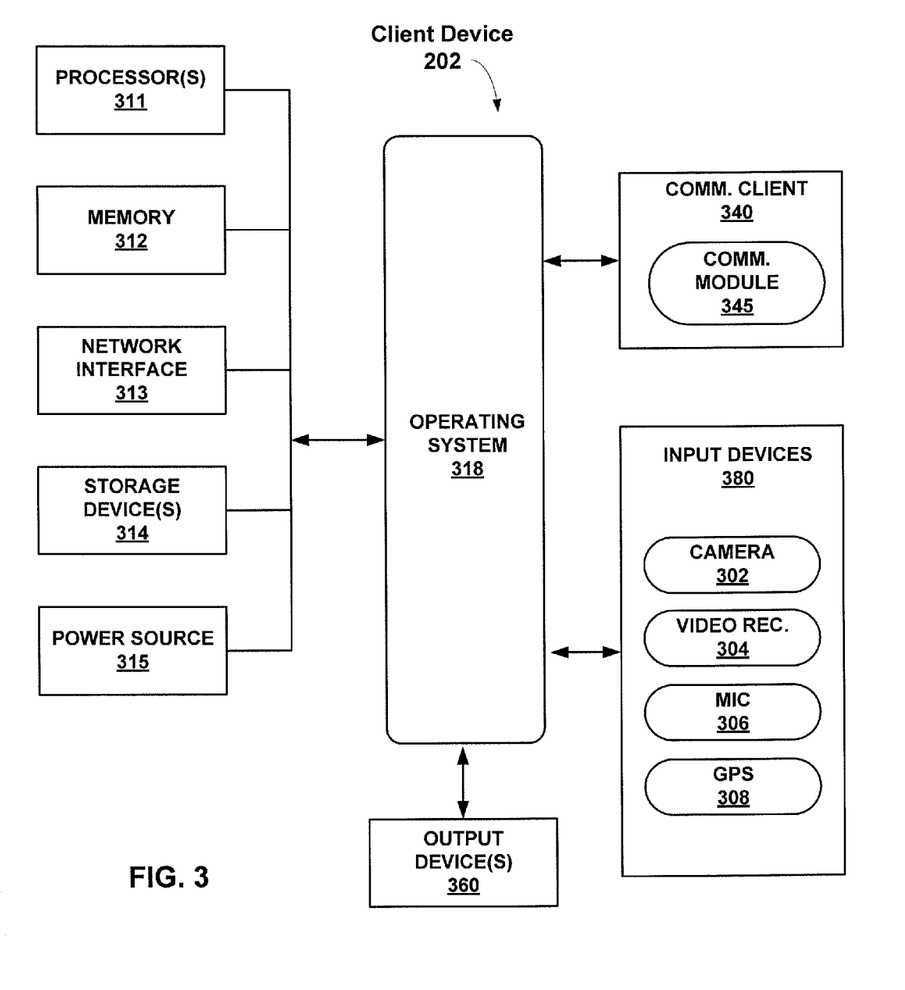
FIG. 3 is a block diagram of example functional components for a client device, according to one embodiment.

FIG. 3 is a block diagram of example functional components for a client device 202, according to one embodiment. One particular example of client device 202 is illustrated. Many other embodiments of the client device 202 may be used. In the illustrated embodiment of FIG. 3, the client device 202 includes one or more processor(s) 311, memory 312, a network interface 313, one or more storage devices 314, a power source 315, output device(s) 360, and input device(s) 380. The client device 202 also includes an operating system 318 and a communications client 340 that are executable by the client. Each of components 311, 312, 313, 314, 315, 360, 380, 318, and 340 is interconnected physically, communicatively, and/or operatively for inter-component communications in any operative manner.

As illustrated, processor(s) 311 are configured to implement functionality and/or process instructions for execution within client device 202. For example, processor(s) 311 execute instructions stored in memory 312 or instructions stored on storage devices 314. Memory 312, which may be a non-transient, computer-readable storage medium, is configured to store information within client device 202 during operation. In some embodiments, memory 312 includes a temporary memory, area for information not to be maintained when the client device 202 is turned OFF. Examples of such temporary memory include volatile memories such as random access memories (RAM), dynamic random access memories (DRAM), and static random access memories (SRAM). Memory 312 maintains program instructions for execution by the processor(s) 311.

Storage devices 314 also include one or more non-transient computer-readable storage media. Storage devices 314 are generally configured to store larger amounts of information than memory 312. Storage devices 314 may further be configured for long-term storage of information. In some examples, storage devices 314 include non-volatile storage elements. Non-limiting examples of non-volatile storage elements include magnetic hard disks, optical discs, floppy discs, flash memories, or forms of electrically programmable memories (EPROM) or electrically erasable and programmable (EEPROM) memories.

The client device 202 uses network interface 313 to communicate with external devices via one or more networks, such telephony network 204 and/or data network 212 shown in FIG. 2. Network interface 313 may be a network interface card, such as an Ethernet card, an optical transceiver, a radio frequency transceiver, or any other type of device that can send and receive information. Other non-limiting examples of network interfaces include wireless network interface, Bluetooth®, 3G and WiFi® radios in mobile computing devices, and USB (Universal Serial Bus). In some embodiments, the client device 202 uses network interface 313 to wirelessly communicate with an external device such as the YATE 206, a mobile phone of another, or other networked computing device.

The client device 202 includes one or more input devices 380. Input devices 380 are configured to receive input from a user through tactile, audio, video, or other sensing feedback. Non-limiting examples of input device 380 include a presence-sensitive screen, a mouse, a keyboard, a voice responsive system, camera 302, a video recorder 304, a microphone 306, a GPS module 308, or any other type of device for detecting a command from a user or sensing the environment. In some examples, a presence-sensitive screen includes a touch-sensitive screen.

One or more output devices 360 are also included in client device 202. Output devices 360 are configured to provide output to a user using tactile, audio, and/or video stimuli. Output devices 360 may include a display screen (part of the presence-sensitive screen), a sound card, a video graphics adapter card, or any other type of device for converting a signal into an appropriate form understandable to humans or machines. Additional examples of output device 360 include a speaker, a cathode ray tube (CRT) monitor, a liquid crystal display (LCD), or any other type of device that can generate intelligible output to a user. In some embodiments, a device may act as both an input device and an output device.

The client device 202 includes one or more power sources 315 to provide power to the client device 202. Non-limiting examples of power source 315 include single-use power sources, rechargeable power sources, and/or power sources developed from nickel-cadmium, lithium-ion, or other suitable material.

The client device 202 includes an operating system 318, such as the Android® operating system. The operating system 318 controls operations of the components of the client device 202. For example, the operating system 318 facilitates the interaction of communications client 340 with processors 311, memory 312, network interface 313, storage device(s) 314, input device 180, output device 160, and power source 315.

As also illustrated in FIG. 3, the client device 202 includes communications client 340. Communications client 340 includes communications module 345. Each of communications client 340 and communications module 345 includes program instructions and/or data that are executable by the client device 202. For example, in one embodiment, communications module 345 includes instructions causing the communications client 340 executing on the client device 202 to perform one or more of the operations and actions described in the present disclosure. In some embodiments, communications client 340 and/or communications module 345 form a part of operating system 318 executing on the client device 202.

Figure 4:
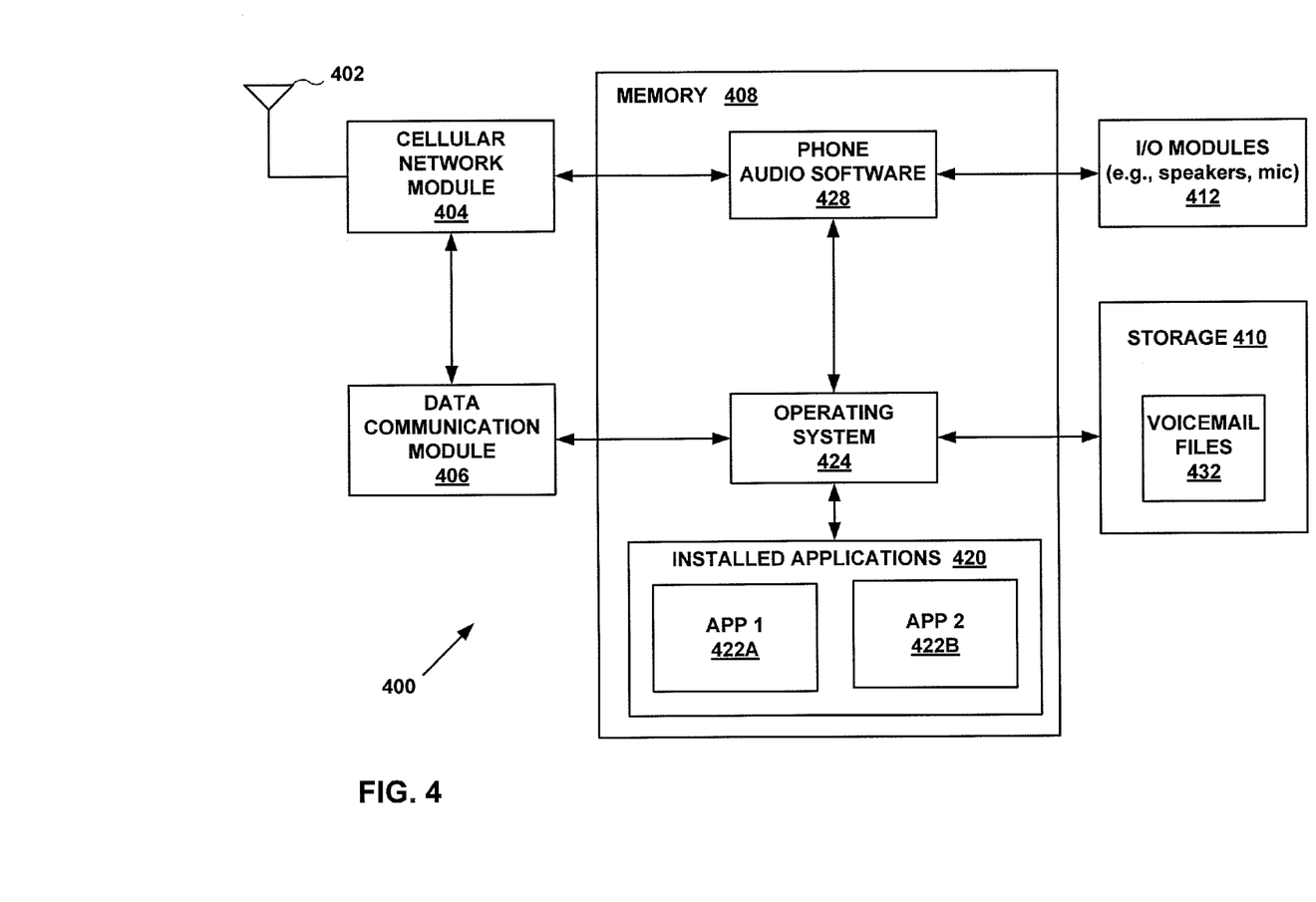
FIG. 4 is a block diagram of the arrangement of applications on a client device configured to locally record voicemail files, according to one embodiment.

FIG. 4 is a block diagram of the arrangement of applications on a client device 400 configured to locally record voicemail files, according to one embodiment. In the embodiment shown in FIG. 4, the client device 400 comprises a mobile phone. As shown, a client device 400 includes an antenna 402, a cellular network module 404, a data communication module 406, a memory 408, a storage device 410, and I/O (input/output) modules 412. The memory 408 includes various applications that are executed by a processor (not shown), including installed applications 420, an operating system 424, and phone audio software 428. For example, installed applications 420 may be downloaded and installed from an applications store, and may include applications 422A, 422B.

The storage device 410 includes non-volatile storage where digital content and information can be stored on the client device 400. In one embodiment, the storage device 410 may store locally recorded voicemail files 432.

The client device 400 can be manipulated by a user to initiate a telephone call between the client device 400 and a recipient device. In one embodiment, the phone call is initiated by the user dialing the phone number manually or selecting the phone number from a contact list. In other embodiments, the call can be initiated through one of the installed applications 420 after the user has authenticated with the installed application. In yet another embodiment, the call may be initiated after the user selects an advertisement presented to the user on a display device of the client device 400 (i.e., a "click-to-call" ad).

After the telephone call connection has been established and the recipient user does not answer the call, the client device 400 enters into a communication session with an IVR system configured to prompt the user to record a voicemail. As described above, the IVR system interacts with an API server to send a notification to the client device 400. The notification is received by a local recording software application configured to query the user of the client device 400 as to whether the call should be recorded locally. According to various embodiments, the local recording software application can be located within the operating system 424, within an installed application 420, and/or the phone audio software 428.

If the user chooses to record the voicemail locally, the audio is recorded by the microphone included in the I/O modules 412 of the client device 400. The recording is stored as a voicemail file 432 in the storage device 410. The voicemail file 432 is then uploaded to the API server via the data communication module 406 and the cellular network module 404.

As shown in the embodiment in FIG. 4, each of the installed applications 420, the operating system 424, and the phone audio software 428 are shown as separate software applications. In other embodiments, the functionality of the installed applications 420, the operating system 424, and the phone audio software 428 can be combined into a single software application (e.g., mobile phone "app"). In still further embodiments, the functionality of the installed applications 420 and the phone audio software 428 may be included in the operating system 424 of the client device 400.

Figure 5:
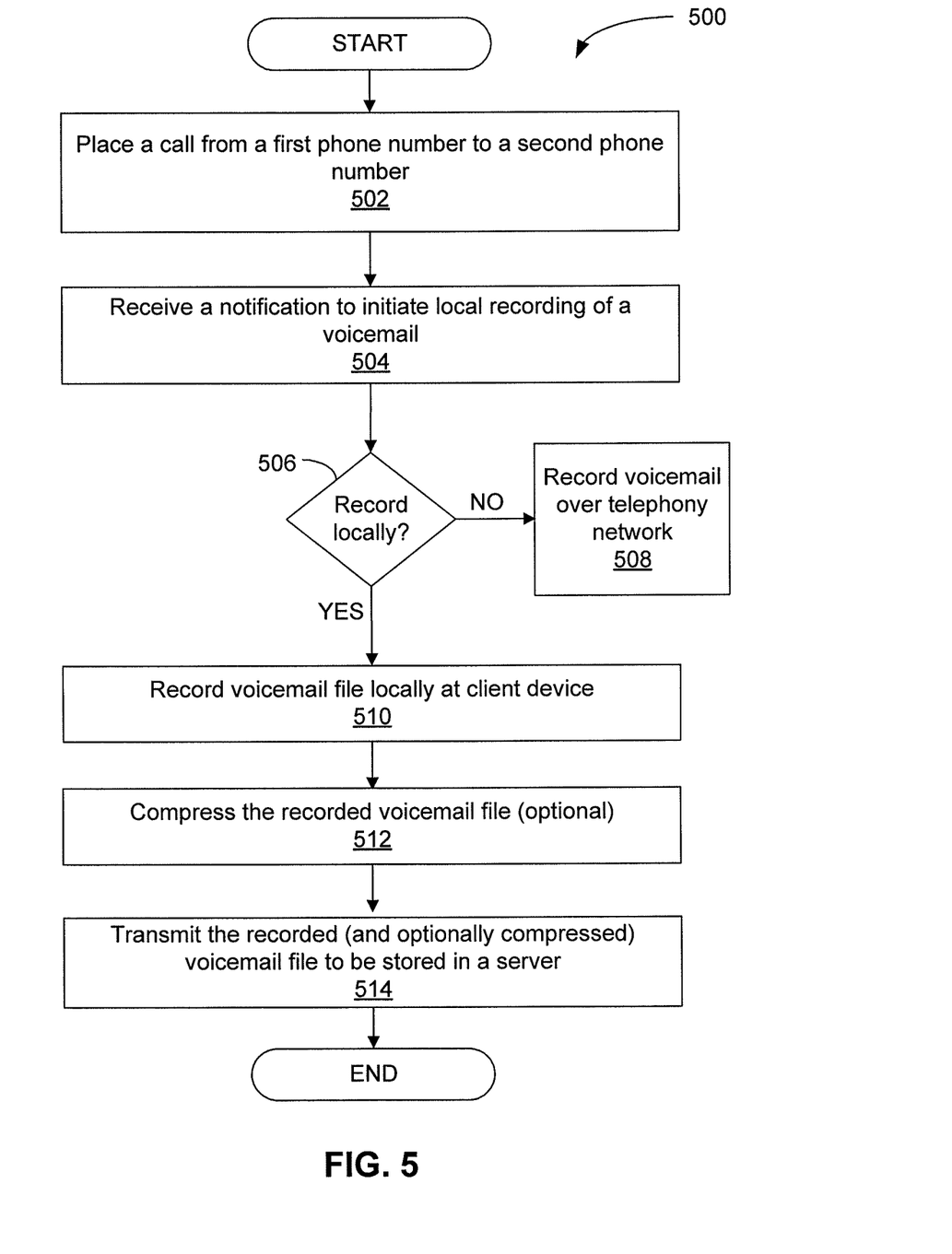
FIG. 5 is a flowchart illustrating recording a voicemail at a caller's phone, according to one embodiment.

FIG. 5 is a flowchart illustrating recording a voicemail at a caller's phone, according to one embodiment. Persons skilled in the art will understand that even though the method 500 is described in conjunction with the systems of FIGS. 2-4, any system configured to perform the method stages is within the scope of embodiments of the disclosure.

As shown, the method 500 begins at stage 502 where a client device places a call from a first phone number to a second phone number. In one example, the client device is a mobile phone with computing capabilities. After some amount of time has passed, the recipient of the call at the second phone number does not answer the call.

At stage 504, the client device receives a notification to initiate local recording of a voicemail. As described above, when the call is not answered at the second phone number, an IVR system is configured to interact with an API server to send a notification to the client device of the caller.

At stage 504, the client device prompts the user as to whether the user would prefer to record the call locally. If the user does not prefer to record the call locally, then the method 500 proceeds to stage 508, where the voicemail is recorded over the telephony network.

If, at stage 506, the user prefers to record the call locally, then the method 500 proceeds to stage 510. At stage 510, the client device records the voicemail locally at the client device. As described, a microphone included in or attached to the client device is configured to record the audio of the voicemail. In one embodiment, after the user chooses to record the voicemail locally, the telephony call between the client device and the IVR is terminated.

At stage 512, the client device compresses the recorded voicemail. According to various embodiments, the compression can use mp3 (MPEG Audio Layer III) compression, Ogg Vorbis compression, or any other codec for compression. Compressing the voicemail may decrease the filesize of the audio file for transmission. In some embodiments, stage 512 is optional and is omitted.

At stage 514, the client device transmits the recorded (and optionally compressed) voicemail file to be stored in a server. The transmission of the voicemail file occurs over a data network that may be separate and distinct from the telephony network. The recipient of the voicemail is able to access the recorded voicemail from the server.

In some embodiment, the user of the caller device is prompted with an option to review the recorded voicemail. The caller can confirm the voicemail is OK or may re-record a new voicemail.

Also, in some embodiments, transmission of the recorded voicemail to the API server may be delayed for a predetermined amount of time. During the delay period (for example, five minutes), the caller may choose to cancel transmission of the recorded voicemail. If the caller chooses to cancel the transmission of the voicemail within the predetermined amount of time, then the voicemail file cannot be retrieved by the recipient since the voicemail is not stored on the voicemail server.

Still further, in some situations, the data network may not be available. In some embodiments, the local recording software application is configured to queue transmission of the recorded voicemail file to the API server when and if the data network becomes available.

Figure 6:
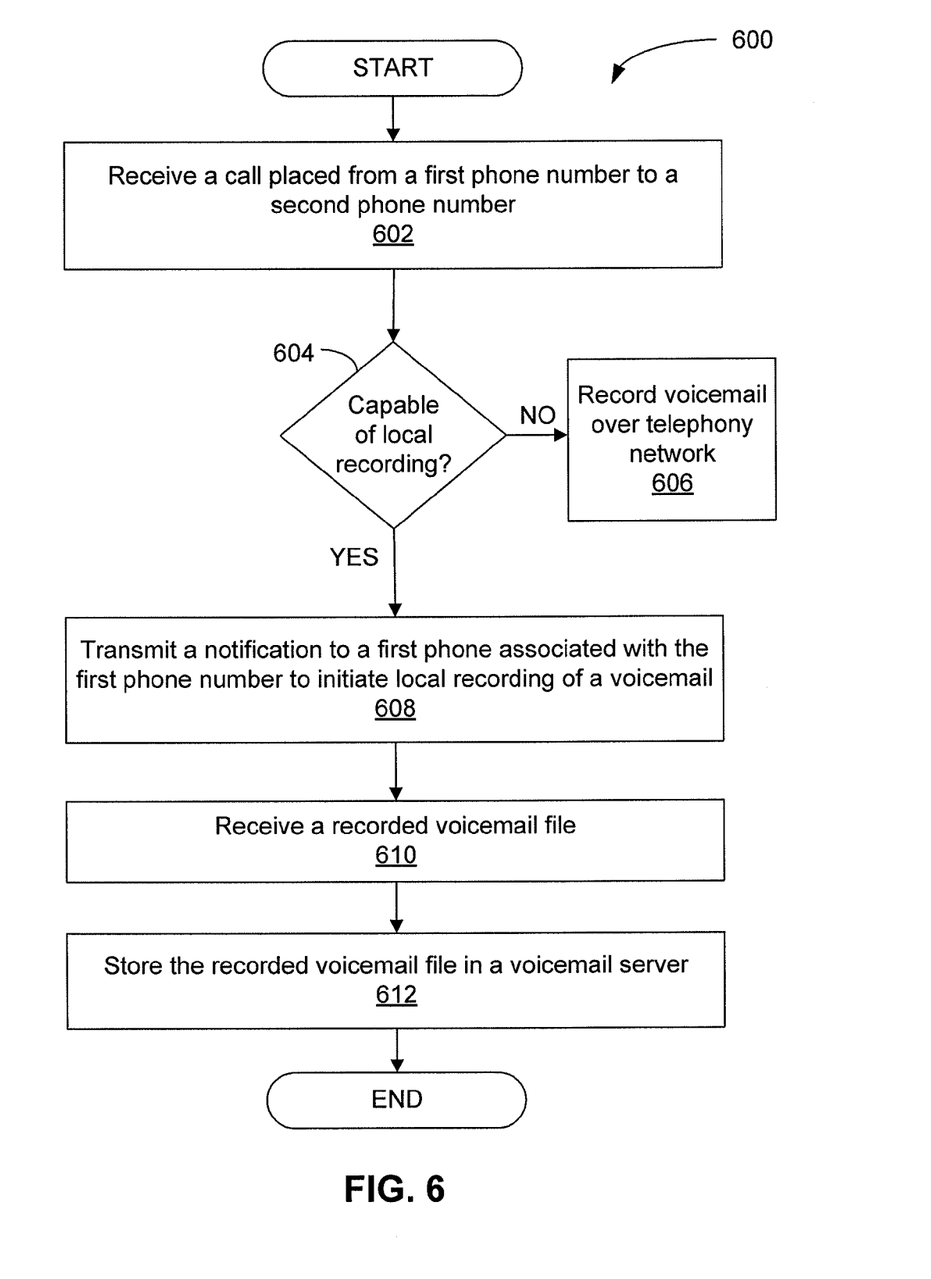
FIG. 6 is a flowchart illustrating storing a voicemail that is recorded at a caller's phone, according to one embodiment.

FIG. 6 is a flowchart illustrating storing a voicemail that is recorded at a caller's phone, according to one embodiment. Persons skilled in the art will understand that even though the method 600 is described in conjunction with the systems of FIGS. 2-4, any system configured to perform the method stages is within the scope of embodiments of the disclosure.

As shown, the method 600 begins at stage 602 where an IVR system receives a call placed from a first phone number to a second phone number. At stage 604, the IVR system determines whether a phone associated with the first phone number is capable of local recording of voicemail. In some embodiments, a listing of users and/or devices and/or phone numbers that are capable of local recording of voicemails may be stored in a database and accessible by the IVR system.

If the IVR system determines that the phone associated with the first phone number is not capable of local recording of voicemail, then the method 600 proceeds to stage 606, where the IVR records the voicemail over the telephony network.

If, at stage 604, the IVR system determines that the phone associated with the first phone number is capable of local recording of voicemail, then the method 600 proceeds to stage 608. At stage 608, a server, for example an API server, transmits a notification to the phone associated with the first phone number to initiate local recording of a voicemail. As described, the IVR system is in data communication with an API server. In some embodiments, the IVR system and the API server comprise the same logical server device. As described in FIG. 5, in response to receiving the notification, the phone prompts the caller as to whether the voicemail should be recorded locally at the phone.

At stage 610, the API server receives the recorded voicemail file over a data network. As described in FIG. 5, the voicemail may have been compressed by the phone prior to the phone transmitting the voicemail to the API server. At stage 612, the API server stores the recorded (and optionally compressed) voicemail file in a voicemail server. The voicemail file is stored in an electronic voicemail server (i.e., the voicemail is accessible as a file transmitted to the recipient device) and/or a telephony voicemail server (i.e., the voicemail is accessibly by the recipient who "calls-in" to the voicemail server). The recipient of the voicemail is able to access the recorded voicemail from the voicemail server.

Figure 7:
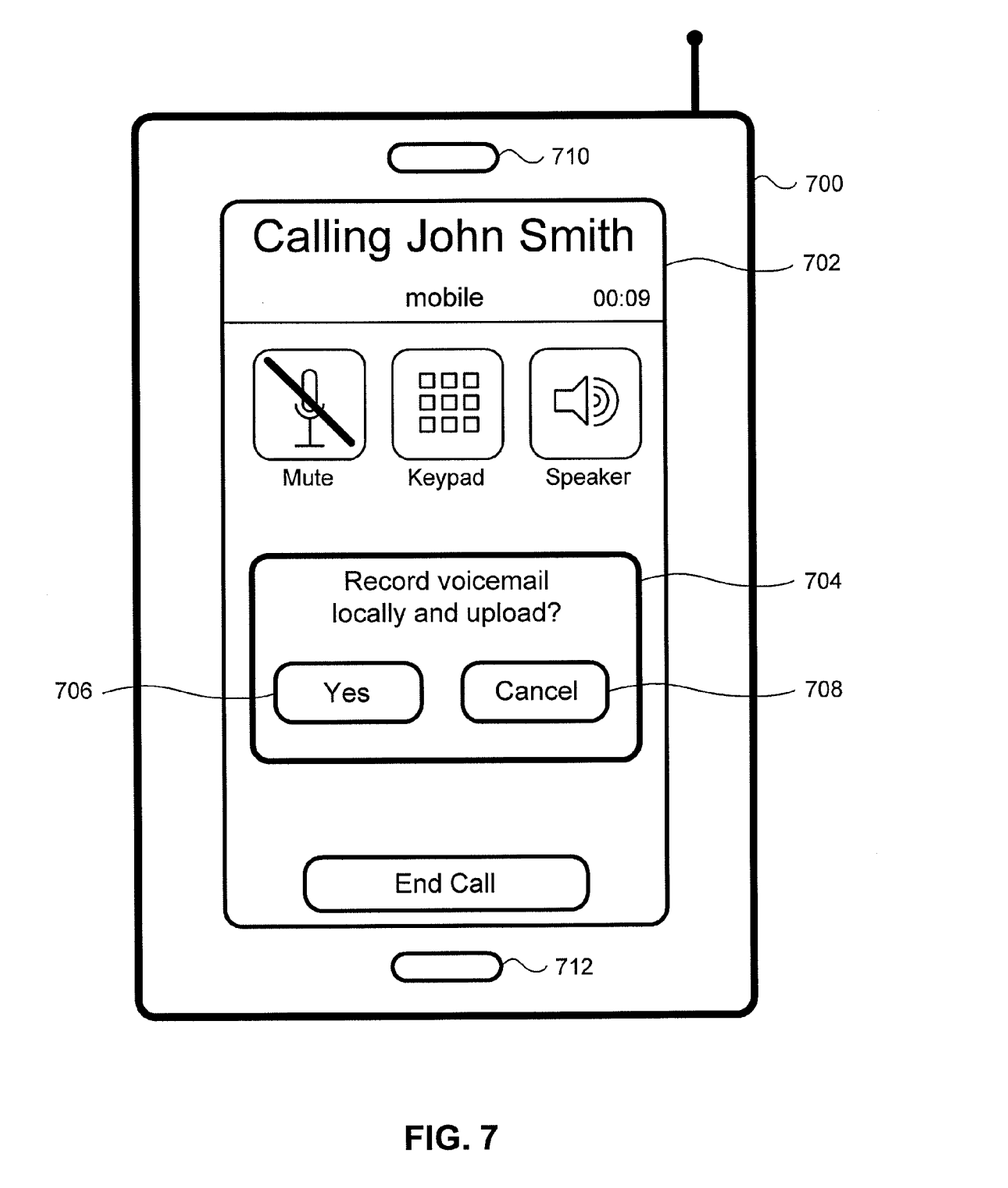
FIG. 7 is a conceptual diagram illustrating a user interface for recording a voicemail at a caller's phone, according to one embodiment.

FIG. 7 is a conceptual diagram illustrating a user interface for recording a voicemail at a caller's phone 700, according to one embodiment. As shown, the phone 700 includes a user interface 702, one or more speakers 710, and one or more microphones 712. A local recording software application is executing on the phone 700.

The local recording software application is configured to receive a notification from an API server as to whether the caller would prefer to record a voicemail locally at the phone 700 or over the telephony network. In response to the notification, the local recording software application causes an audible and/or visual prompt to be presented to the caller. The audible prompt is presented to the caller through the one or more speakers 710. The visual prompt is displayed on the user interface 702.

In the example shown in FIG. 7, prompt 704 is displayed in the user interface 702. The user can confirm that the voicemail should be recorded locally by selecting button 706 or may cancel local recording (and record the voicemail over the telephony network) by selecting button 708.

Advantageously, embodiments of the invention provide a system and method for local recording of voicemail files. Since the recording is not performed over the noisy telephony network, the audio quality of recorded voicemails is significantly improved.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to retrieve content (i.e., recorded voicemails) from a content server (i.e., a voicemail server). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as, for example, to a city, ZIP code, or state level), so that a particular location of a user cannot be determined. Thus, the user may have control over how information is collected about him or her and used by the systems discussed herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for recording voicemail, comprising:
   receiving, at a server, a call placed over a telephony network from a first client device associated with a first phone number to a second phone number, wherein the first client device is capable of recording voicemail files at the first client device;
   transmitting, from the server, a notification to the first client device associated with the first phone number to initiate recording of a voicemail at a location local to the first client device, wherein the notification is transmitted over a data network;
   receiving, at the server, from the first client device, and over the data network, the recorded voicemail;
   terminating the call placed over the telephony network;
   storing the recorded voicemail; and
   establishing a session with a second client device associated with the second phone number so as to allow the second client device to access the recorded voicemail.

2. A method according to claim 1, further comprising verifying that the first client device supports recording of voicemail files at the location local to the first client device.

3. A method according to claim 1, further comprising querying the first client device as to whether the voicemail should be recorded locally on the first client device or recorded via a telephony service.

4. A method according to claim 1, wherein the recorded voicemail is stored in a storage server that comprises an electronic voicemail server or a telephony voicemail server.

5. A method according to claim 1, wherein the recorded voicemail is compressed by the first client device.

6. A method for recording voicemail, comprising:
   placing a call from a first phone number to a second phone number, wherein the call is placed from a client device and received by a server;
   receiving, from the server, a notification at the client device to initiate local recording of a voicemail;
   recording a voicemail file at the client device;
   compressing the recorded voicemail file; and
   transmitting the recorded and compressed voicemail file to be stored in a storage server.

7. A method according to claim 6, further comprising presenting an audible and/or visual query as to whether the voicemail should be recorded at the client device or over a telephony network.

8. A method according to claim 6, further comprising providing an interface to review the recorded voicemail file and/or re-record the recorded voicemail.

9. A method according to claim 6, further comprising delaying transmission of the recorded and compressed voicemail file for a preset amount of time, wherein the transmission of the recorded and compressed voicemail file can be cancelled within the preset amount of time.

10. A method according to claim 6, further comprising determining that a network for transmission of the recorded and compressed voicemail file is not available and transmitting the recorded and compressed voicemail file when the network becomes available.

11. A system for recording voicemail, comprising:
    a first phone;
    a second phone, wherein a call is placed from the first phone to the second phone; and
    a server configured to:
       receive the call from the first phone,
       transmit a notification to the first phone to initiate recording of a voicemail at a location local to the first phone,
       receive a file of the voicemail recorded by the first phone,
       store the recorded voicemail, and
       establish a session between the server and the second phone to access the recorded voicemail.

12. A system according to claim 11, further comprising an interactive voice response (IVR) system configured to communicate with the server.

13. A system according to claim 11, further comprising a voicemail server in which the recorded voicemail is stored.

14. A system according to claim 13, wherein the voicemail server comprises an electronic voicemail server or a telephony voicemail server.

15. A system according to claim 11, wherein the server is further configured to verify that the first phone supports local recording of voicemail files.

16. A system according to claim 11, wherein the first phone is configured to present a prompt as to whether the voicemail should be recorded locally on the first phone or recorded via a telephony service.

17. A system according to claim 16, wherein the prompt is audible and/or visual.

18. A system according to claim 11, wherein the file is compressed by the first phone.

19. A system according to claim 11, wherein the first phone provides an interface to review the recorded voicemail file and/or re-record the recorded voicemail.

20. A system according to claim 11, wherein the first phone is configured to delay transmission of the recorded voicemail file for a preset amount of time, wherein the transmission of the recorded voicemail file can be cancelled within the preset amount of time.

* * * * *